United States Patent
Nahidi et al.

(10) Patent No.: US 11,820,437 B2
(45) Date of Patent: Nov. 21, 2023

(54) SYSTEM AND METHOD FOR OPTIMAL VEHICLE DOWNFORCE ALLOCATION

(71) Applicant: GM GLOBAL TECHNOLOGY OPERATIONS LLC, Detroit, MI (US)

(72) Inventors: Seyedeh Asal Nahidi, North York (CA); Saurabh Kapoor, Markham (CA); SeyedAlireza Kasaiezadeh Mahabadi, Novi, MI (US); Naser Mehrabi, Richmond Hill (CA); James H. Holbrook, Fenton, MI (US); Hualin Tan, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 17/103,764

(22) Filed: Nov. 24, 2020

(65) Prior Publication Data
US 2022/0161874 A1    May 26, 2022

(51) Int. Cl.
*B62D 37/02*    (2006.01)
*B62D 35/00*    (2006.01)
*B62D 15/02*    (2006.01)

(52) U.S. Cl.
CPC .......... *B62D 37/02* (2013.01); *B62D 15/021* (2013.01); *B62D 35/005* (2013.01); *B62D 35/007* (2013.01)

(58) Field of Classification Search
CPC .... B62D 37/02; B62D 15/021; B62D 35/005; B62D 35/007
See application file for complete search history.

(56) References Cited

U.S. PATENT DOCUMENTS

| | | | |
|---|---|---|---|
| 10,246,141 B2 | 4/2019 | Potvin et al. | |
| 2009/0024269 A1* | 1/2009 | Shorten | G01M 1/122 701/31.4 |
| 2013/0238198 A1* | 9/2013 | Prentice | B62D 35/02 296/180.1 |
| 2016/0016618 A1* | 1/2016 | Wolf | B62D 35/02 296/180.5 |
| 2017/0080908 A1* | 3/2017 | Morgan | B60T 8/171 |
| 2017/0088106 A1* | 3/2017 | Fahland | B60T 8/1766 |
| 2017/0088201 A1* | 3/2017 | Heil | B62D 35/005 |
| 2018/0022403 A1* | 1/2018 | Fahland | B62D 35/02 701/49 |
| 2018/0111650 A1* | 4/2018 | Swantick | B62D 35/005 |
| 2018/0244271 A1* | 8/2018 | Krueger | G05D 1/0088 |
| 2018/0297650 A1* | 10/2018 | Titus | B62D 37/02 |
| 2019/0100194 A1* | 4/2019 | Fahland | B60W 30/18109 |

(Continued)

FOREIGN PATENT DOCUMENTS

EP    2987697 A2 *    2/2016    ............ B60W 10/18

*Primary Examiner* — Navid Z. Mehdizadeh
*Assistant Examiner* — Kenneth M Dunne
(74) *Attorney, Agent, or Firm* — Lorenz & Kopf LLP (57) ABSTRACT

An aerodynamic deflector on the vehicle is repositionable. An actuator is coupled with the aerodynamic deflector. A controller configured to: detect a performance mode of operation of the vehicle; determine a requested lateral acceleration; calculate a control adjustment of the aerodynamic deflector to generate a downforce to achieve the requested lateral acceleration and maximize lateral grip of the vehicle; and operate the actuator to effect the control adjustment of the aerodynamic deflector to generate the downforce on the vehicle.

20 Claims, 8 Drawing Sheets

(56) References Cited

U.S. PATENT DOCUMENTS

2020/0010130 A1\* 1/2020 Shiogai .................. B62D 37/02
2020/0207332 A1\* 7/2020 Chatzikomis ............. B60L 7/00
2023/0038657 A1\* 2/2023 Bartels ................. B62D 35/005

\* cited by examiner

SYSTEM AND METHOD FOR OPTIMAL VEHICLE DOWNFORCE ALLOCATION

The present disclosure generally relates to active control of exterior vehicle airflow, and more particularly relates to optimal downforce allocation to balance lateral tire forces and enhance lateral grip in performance vehicles.

The ability of a land vehicle to accelerate, brake and corner is limited by the amount of traction available between the vehicle's wheels and the road surface. Traction or frictional force is a function of the applicable coefficient of friction and the normal force applied due to the vehicle's weight. A variety of devices generate additional downward force on a vehicle to increase its normal force by, for example, using the force of oncoming air to push the vehicle downward. For many types of ground vehicles, low drag and low lift (increased downforce) are both desirable for various outcomes such as efficiency and performance. If not offset, such as by devices that reduce drag and/or increase downforce, both drag and lift tend to increase significantly as operating speed increases. Lift decreases a vehicle's normal force and as a result, reduces traction.

Various types of aerodynamic devices and structures have been used to effect changes in airflow around a vehicle. Airfoils generally create pressure differentials and are sometimes adapted as wings with smooth, properly shaped and angled surfaces to create downforce. An air dam increases downforce/decreases lift and reduces drag. Various air dams reduce drag by reducing the rate of air flow under the car, which avoids creating drag caused by structures under the car. A spoiler is designed to reduce lift and increase normal force but also considerably increases drag. The various devices change/deflect air movement over the body of a vehicle in motion to effect desirable outcomes such as increased downward force for improved tire grip.

Aerodynamic devices have been used to improve tire capacity but at the same time overuse results in excessive and inefficient longitudinal drag, and reduces vehicle speed in certain conditions. Different vehicle operating conditions have different downforce requirements and so generating downforce is desirably limited to necessary amounts for the operating conditions. Excessive downforce generation leading to inefficiencies is preferable avoided.

Accordingly, it is desirable to provide methods and systems for optimal downforce allocation in a vehicle. Furthermore, other desirable features and characteristics of the present invention will become apparent from the subsequent detailed description and the appended claims, taken in conjunction with the accompanying drawings and the foregoing technical field and background.

SUMMARY

A number of embodiments include systems and methods for generating a downforce on a vehicle. In some embodiments, an aerodynamic deflector on the vehicle is repositionable. An actuator is coupled with the aerodynamic deflector. A controller is configured to: detect a performance mode of operation of the vehicle; determine a requested lateral acceleration; calculate a control adjustment of the aerodynamic deflector, where the calculation determines a downforce to achieve the requested lateral acceleration and maximize lateral grip of the vehicle; and operate the actuator to effect the control adjustment of the aerodynamic deflector to generate the downforce on the vehicle.

In additional embodiments, the controller determines an optimum allocation of the downforce between a front and a rear of the vehicle.

In additional embodiments, a steering angle sensor is provided on the vehicle and a pedal position sensor is provided on the vehicle. The controller determines the requested lateral acceleration based on inputs from the steering angle sensor and the pedal position sensor.

In additional embodiments, the controller determines the maximum lateral grip achievable by the vehicle where all available tire capacity is used in a lateral direction of the vehicle.

In additional embodiments, the controller determines a minimum required downforce contributed by the aerodynamic deflector to minimize effects of the aerodynamic deflector on forward movement of the vehicle.

In additional embodiments, the controller evaluates constraints of the aerodynamic deflector in generating downforce.

In additional embodiments, the controller determines a relationship between force capacities of front and rear wheels to generate the lateral grip.

In additional embodiments, the controller determines a lateral force request based on the requested lateral acceleration, and determines an optimum solution to satisfy both the relationship between force capacities of the front and rear wheels, and the lateral force request.

In additional embodiments, the relationship between force capacities of the front and rear wheels is defined by:

$$\left(\frac{F_{Y,F}^{lim}}{L_R} - \frac{F_{Y,R}^{lim}}{L_F}\right) + \left(\frac{M_z^{EXT}}{L_F L_R}\right) = 0;$$

where $F_{Y,F}^{lim}$ is a lateral force limit at the front wheels, $F_{Y,R}^{lim}$ is a lateral force limit at the rear wheels, $L_F$ is a distance from a center of gravity of the vehicle to the front wheels; $L_R$ is a distance from the center of gravity to the rear wheels, and $M_z^{ext}$ is an external yaw moment on the vehicle.

In additional embodiments, the lateral force request is defined by:

$$F_{Y,F}^{lim} + F_{Y,R}^{lim} = \frac{m\delta V_x^2}{L};$$

where m is mass of the vehicle, $\delta$ is a steering angle of the vehicle, V is velocity of the vehicle in a longitudinal direction, and L is a wheelbase of the vehicle.

In a number of additional embodiments, a method for generating a downforce on a vehicle includes detecting, by a controller, a performance mode of operation of the vehicle. The controller determines a requested lateral acceleration. The controller calculates a control adjustment of the aerodynamic deflector to generate a downforce to achieve the requested lateral acceleration and maximize lateral grip of the vehicle. The controller operates an actuator coup-led to an aerodynamic deflector to effect the control adjustment of the aerodynamic deflector to generate the downforce on the vehicle.

In additional embodiments, the controller determines an optimum allocation of the downforce between a front and a rear of the vehicle.

In additional embodiments, the controller determines the requested lateral acceleration based on inputs from a steering angle sensor and a pedal position sensor.

In additional embodiments, the controller determines the maximum lateral grip achievable by the vehicle where all available tire capacity is used in a lateral direction of the vehicle.

In additional embodiments, the controller determines a minimum required downforce contributed by an aerodynamic deflector to minimize effects of the aerodynamic deflector on forward movement of the vehicle.

In additional embodiments, the controller evaluates constraints of the aerodynamic deflector in generating downforce.

In additional embodiments, the controller determines a relationship between force capacities of front and rear wheels of the vehicle to generate the lateral grip.

In additional embodiments, the controller determines a lateral force request based on the requested lateral acceleration, and determines an optimum solution to satisfy both the relationship between force capacities of the front and rear wheels, and the lateral force request.

In additional embodiments, the relationship between force capacities of the front and rear wheels is determined by:

$$\left(\frac{F_{Y,F}^{lim}}{L_R} - \frac{F_{Y,R}^{lim}}{L_F}\right) + \left(\frac{M_z^{EXT}}{L_F L_R}\right) = 0;$$

where $F_{Y,F}^{lim}$ is a lateral force limit at the front wheels, $F_{Y,R}^{lim}$ is a lateral force limit at the rear wheels, $L_F$ is a distance from a center of gravity of the vehicle to the front wheels; $L_R$ is a distance from the center of gravity to the rear wheels, and $M_z^{ext}$ is an external yaw moment on the vehicle. The lateral force request is determined by:

$$F_{Y,F}^{lim} + F_{Y,R}^{lim} = \frac{m\delta V_x^2}{L};$$

where m is mass of the vehicle, δ is a steering angle of the vehicle, V is velocity of the vehicle in a longitudinal direction, and L is a wheelbase of the vehicle.

In a number of other embodiments, a vehicle with active-aero actuators includes a first aerodynamic deflector at a front of the vehicle, and a second aerodynamic deflector at a rear of the vehicle. A first actuator is coupled with the first aerodynamic deflector and a second actuator is coupled with the second aerodynamic deflector. A controller is configured to: detect a performance mode of operation of the vehicle; determine a maximum lateral grip condition of the vehicle without contribution from the active-aero actuators; determine a requested lateral acceleration; calculate control adjustments of the first and second aerodynamic deflectors to generate a downforce that is balanced between the front and the rear of the vehicle to achieve the requested lateral acceleration and maximize lateral grip of the vehicle; and operate the first and second actuators to effect the control adjustments of the first and second aerodynamic deflectors to generate the downforce on the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of various systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed systems and methods use active aerodynamic deflector capabilities to generate variable downforce at a vehicles front and rear axles in cooperation, to maintain a balanced lateral tire force load. An aerodynamic deflector is any device that alters air flow over a vehicle and that generates downforce and/or reduces lift, such as a spoiler, wing, door, air dam, or other device. The normal force on the vehicle, when increased, increases tire capacity, which is the ability of a tire to generate force between the vehicle and the roadway. The total normal force is the sum of the static (weight) load from the vehicle plus force components from lateral and longitudinal accelerations, plus the downward force contributed by active aerodynamic deflectors. The total normal force is an indicator of total tire capacity. The total tire capacity, which is the limit of the tire to generate force, is distributed longitudinally and laterally during operation of the vehicle, where some is used for longitudinal force and some is used for lateral force. The ability to generate longitudinal and lateral force is a function of total normal force and therefore of the downward force that is generated by the active aerodynamic deflector.

As described herein, an optimal downforce allocation between the front and rear axles of a vehicle is determined to ensure the lateral tire forces are balanced at the vehicle level, and the contribution of active aerodynamic deflector (active aero) generated downforce is limited to avoid undesirable longitudinal drag for efficiency. Accordingly, in a number of embodiments, active aero operation is initiated only when driver inputs are detected that call for a performance mode of operation of the vehicle. In a number of embodiments, maximum lateral grip is determined to calculate the limit of lateral acceleration that is potentially generated. From driver inputs, the amount of lateral acceleration requested is determined. If the requested lateral acceleration is greater than the amount the maximum lateral grip can generate without active aero, then active aero is initiated. Accordingly, when the requested lateral acceleration requires greater force than available for the lateral component of the total tire capacity, the requested lateral acceleration and the vehicle behavior are considered to determine how much lateral force is needed at the front and rear axles to ensure the forces generated meet the request and are balanced. The relationship for balance between the front and rear axles is determined as a function of the particular vehicle configuration, and therefore varies for each application. The amount of lateral force required at each axle is determined. Components of the vehicle's normal force (static, load transfer and downforce), are evaluated to determine the amount of downforce required to generate the lateral force needed to generate the requested lateral acceleration. The constraints of the front and rear active aerodynamic deflectors are considered, and the devices are controlled to deliver the needed downforce component.

Figure 1:
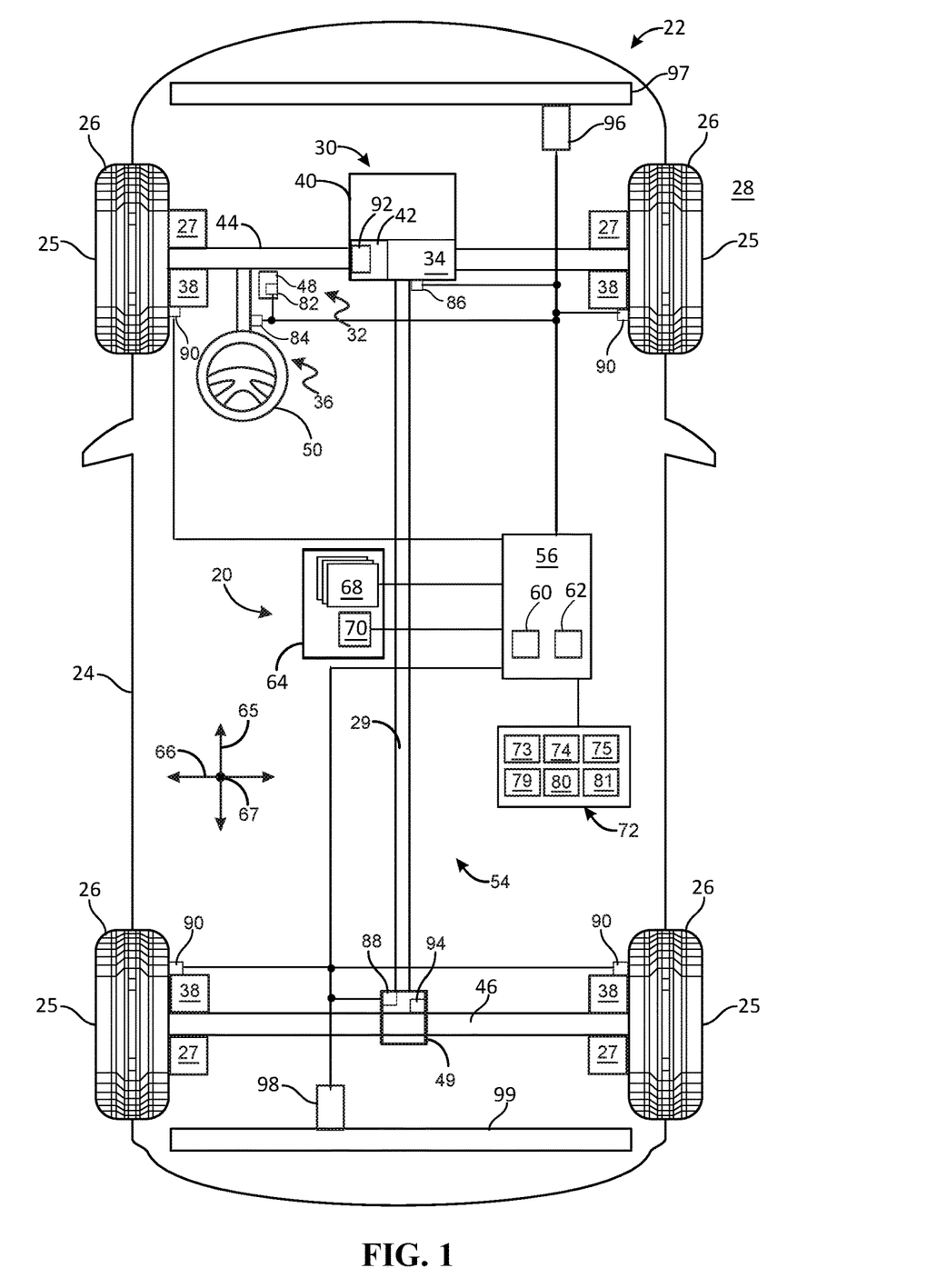
FIG. 1 is a schematic diagram of a vehicle with a downforce allocation system, in accordance with various embodiments.

With reference to FIG. 1, illustrated is one example of a downforce allocation system 20 as implemented in a vehicle 22. As depicted in FIG. 1, the vehicle 22 generally includes a body 24, supported on wheels 25 by a suspension system 27. The body 24 substantially encloses components of the vehicle 22, and the wheels 25 are each rotationally coupled near a respective corner of the body 24. In various embodiments, the vehicle 22 includes a prop shaft 29 and is a rear wheel drive vehicle or an all-wheel drive vehicle, however other drive arrangements are contemplated. The vehicle 22 operates using forces generated as a result of traction due to friction between tires 26 of the wheels 25 and a roadway 28.

As shown, the vehicle 22 has various vehicle systems that generally include a propulsion system 30 with an accelerator system 32 and a transmission system 34, a steering system 36, and a brake system 38. The brake system may be operated by a pedal (not shown) and/or electronically. The propulsion system 30 may, in various embodiments, include a power system, which in the current embodiment includes an internal combustion engine 40. In other embodiments, the propulsion system 30 may include an electric machine such as a motor, a fuel cell and/or another power source in addition to, or in place of, the engine 40. The transmission system 34 may be configured to transmit power from the propulsion system 30 to one or more of the vehicle wheels 25 according to selectable speed ratios. According to various embodiments, the transmission system 34 may include a step-ratio automatic transmission, a continuously-variable transmission, or other appropriate transmission. In the current embodiment, the propulsion system 30 includes an electric all-wheel drive (eAWD) system 42. The eAWD system 42 is configured to selectively engage one of the axles 44, 46. For example, in a rear wheel drive configuration, the propulsion system normally drives the rear axle 46 and the eAWD system 42 engages the front axle 44, such as by an actuator 92 that may be an electric motor. In a front wheel drive configuration, the propulsion system 30 normally drives the front axle 44 and the eAWD system 42 engages the rear axle 46 to deliver a selected amount of torque between the front and rear axles 44, 46. The sum of the torque delivered to the front and rear axles 44, 46 is equal to the total requested torque such as by the driver. In a full time all-wheel drive system, a combination of the propulsion system 30 and the eAWD system 42 engages the front and rear axles 44, 46 under all conditions. In various embodiments, the eAWD system 42 is integrated with the rear axle 46. In the current embodiment one of the axles 44, 46, and specifically the rear axle 46, also includes an electric limited slip differential (eLSD) system 49. The eLSD system 49 is configured to selectively vary the torque delivered to the two rear wheels 25 such as for torque vectoring in transferring torque from one side of the axle 46 to the other.

The accelerator system 32 is configured to activate the propulsion system 30 to accelerate the vehicle 22 and to decelerate the vehicle 22. The accelerator system 32 may respond to driver inputs, and/or may respond to electronic control. The accelerator system 32 may include a throttle, such as with an internal combustion engine 40, electric control, such as with an electric vehicle, or another mechanism to control acceleration. The brake system 38 is configured to provide braking torque to the vehicle wheels 25 and in operation generates deceleration. The brake system 38 may, in various embodiments, include friction brakes, brake by wire, a regenerative braking system such as an electric machine, and/or other appropriate braking systems. The steering system 36 influences a position of a number of the vehicle wheels 25. For example, the steering system 36 is configured to turn the wheels 25 at the front axle 44 to change the trajectory of the vehicle 22. The accelerator system 32, the brake system 38 and steering system 36 receive inputs from the driver via an accelerator pedal 48 a brake pedal (not depicted), and steering wheel 50. In a number of embodiments, the inputs may be provided electronically through various actuators.

The vehicle 22 includes a control system 54 to control various aspects via a number of controllers 56. In the current embodiment, one controller 56 is illustrated for simplicity, however, various systems of the vehicle 22 may have separate controllers that control functions independently and/or in coordination with other controllers. Reference to a controller or the controller is intended to mean one or more controllers. In general, the controller 56 may generate output signals for delivery to various controlled devices that are arranged to control the operation of a various systems of the vehicle 22 including the downforce allocation system 20. For example, the propulsion system 30, the accelerator system 32, the transmission system 34, the steering system 36, the brake system 38, the eAWD system 42 and the eLSD system 49 are controlled by the controller 56 and/or additional controllers.

The control system 54 controls operation of the vehicle 22 including the downforce optimization system 20 to deliver the desired operational performance including to allocate optimal active aero downforce on the front and rear axles 44, 46 to fulfill driver desired lateral acceleration, maximum lateral grip, and minimum drag force generation as appropriate for handling maneuvers of the vehicle 22. In general, the controller 56 uses the available inputs, including those from various sensors and actuators, to provide the control system 54 with parameter data to effectively govern various functions of the vehicle 22 including the downforce allocation system 20.

The various sensors include an inertial sensor package 72 that provides inputs for determining how the vehicle 22 is moving. The inertial sensor package 72 may include a number of single accelerometers 73, 74 and/or 75 to measure linear acceleration in the longitudinal (X-axis 65), lateral (Y-axis 66) and vertical (Z-axis 67) directions, respectively. In some embodiments, some or all of the accelerometers 73-75 may be combined into a multi axis accelerometer or accelerometers. The inertial sensor package 72 may also include one or more rate gyroscopes 79, 80 and/or 81 that detect rotational rate about the X-axis 65, Y-axis 66 and/or Z-axis 67. The inertial sensor package may be combined in a single inertial measurement unit or may be packaged in any number of individual or combined units. An inertial measurement unit includes a 3-axis linear accelerometer and 3-axis rate gyroscope to measure six degrees of freedom for capturing both linear (X-axis, Y-axis, Z-axis) and rotation (roll, pitch, and yaw) components. The various sensors also include a pedal position sensor 82 at the accelerator system 32, a steering angle sensor 84 at steering system 36, a vehicle speed sensor 86 at the propulsion system 30, a torque sensor 88 at the eLSD system 49 and a wheel speed sensor 90 at each wheel 25.

The various actuators include an eAWD actuator 92 such as an electric motor and an eLSD actuator 94, such as a solenoid for engaging clutches. An active-aero actuator 96, such as a linear electric or rotary electric actuator, is coupled with a front aerodynamic deflector 97 to vary the angle and/or position thereof. The front aerodynamic deflector 97 is configured to effect changes in airflow around the vehicle 22 when moved by the active-aero actuator 96. The aerodynamic deflector 97 may be any combination of an air dam, a wing, a strake, grill vents that open and close, a suspension that raises and lowers, or other devices that change air flow around the vehicle 22 to increase/decrease downforce at the front axle 44. Another active-aero actuator 98, such as a linear electric or rotary electric actuator is coupled with a rear aerodynamic deflector 99 to vary the angle and/or position thereof. The rear aerodynamic deflector 99 is configured to effect changes in airflow around the vehicle 22 when moved by the active-aero actuator 98. The aerodynamic deflector 99 may be any combination of a wing, a spoiler, a suspension that raises and lowers, or other devices that change that air flow around the vehicle 22 to increase/decrease downforce at the rear axle 46.

Figure 3:
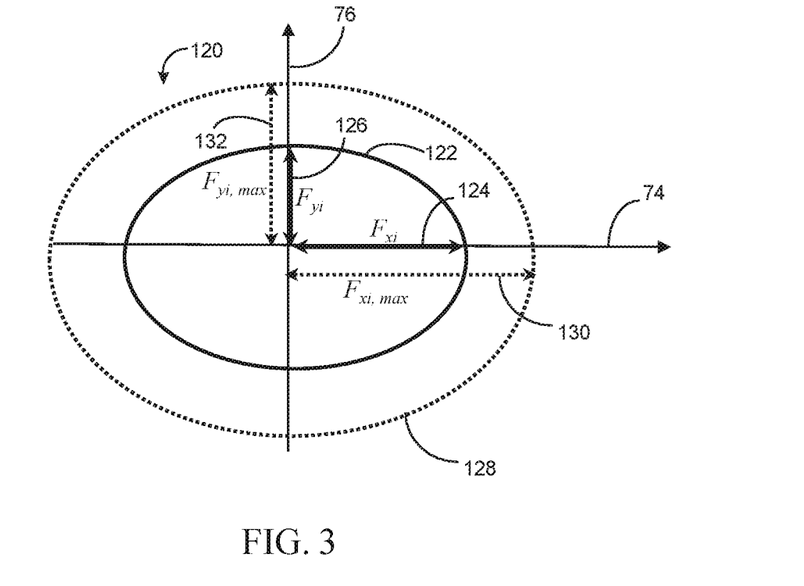
FIG. 3 is a force ellipse diagram of tire capacity for the vehicle of FIG. 1, in accordance with various embodiments.

The controller 56 may comprise any number of electronic control modules, including the modules of FIG. 3, and is configured to receive information from various sources, process that information, and provide control signals/commands based thereon to effect outcomes such as operation of the vehicle 22 including the downforce allocation system 20 and related systems. In the depicted embodiment, the controller 56 includes a processor 60 and a memory device 62, and is coupled with a storage device 64. The processor 60 performs the computation and control functions of the controller 56, and may comprise any type of processor or multiple processors, single integrated circuits such as a microprocessor, or any suitable number of integrated circuit devices and/or circuit boards working in cooperation to accomplish the functions of a processing unit. During operation, the processor 60 executes one or more programs 68 and may use data 70, each of which may be contained within the storage device 64 and as such, the processor 60 controls the general operation of the controller 56 in executing the processes described herein, such as the processes described further below in connection with FIGS. 4 and 5.

The memory device 62 may be any type of suitable memory. For example, the memory device 62 may include volatile and nonvolatile storage in read-only memory (ROM), random-access memory (RAM), and keep-alive memory (KAM), for example. KAM may comprise a persistent or non-volatile memory that may be used to store various operating variables while the processor 60 is powered down. The memory device 62 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 56. In certain embodiments, the memory device 62 may be located on and/or co-located on the same computer chip as the processor 60. In the depicted embodiment, the memory device 62 may store the above-referenced programs 68 along with one or more stored values of the data 70 such as for short-term data access.

The storage device 64 stores data, such as for long-term data access for use in automatically controlling the vehicle 22 including the downforce allocation system 20 and its related systems. The storage device 64 may be any suitable type of storage apparatus, including direct access storage devices such as hard disk drives, flash systems, floppy disk drives and optical disk drives. In one exemplary embodiment, the storage device 64 comprises a source from which the memory device 62 receives the programs 68 that execute one or more embodiments of one or more processes of the present disclosure, such as the steps of the process (and any sub-processes thereof) described further below in connection with FIGS. 4 and 5. In another exemplary embodiment, the programs 68 may be directly stored in and/or otherwise accessed by the memory device 62. The programs 68 represent executable instructions, used by the electronic controller 56 in processing information and in controlling the vehicle 22 including the downforce allocation system 20 and its related systems. The instructions may include one or more separate programs 68, each of which comprises an ordered listing of executable instructions for implementing logical functions. The instructions, when executed by the processor 60 support the receipt and processing of signals such as from the various sensors, and the performance of logic, calculations, methods and/or algorithms for automatically controlling the components and systems of the vehicle 22, such as the various actuators. The processor 60 may generate control signals for the downforce allocation system 20, and to automatically control various components and systems of the vehicle 22, based on the logic, calculations, methods, and/or algorithms. As will be appreciated, the data storage device 64 may be part of the controller 56, separate from the controller 56, part of one or more other controllers, or part of multiple systems. The memory device 62 and the data storage device 64 work together with the processor 60 to access and use the programs 68 and the data 70. While the components of the engine control system 54 are depicted as being part of the same system, it will be appreciated that in certain embodiments, these features may comprise multiple systems. In addition, in various embodiments the downforce allocation system 20 may comprise all or part of, and/or may be coupled to, various other vehicle devices and systems.

Figure 2:
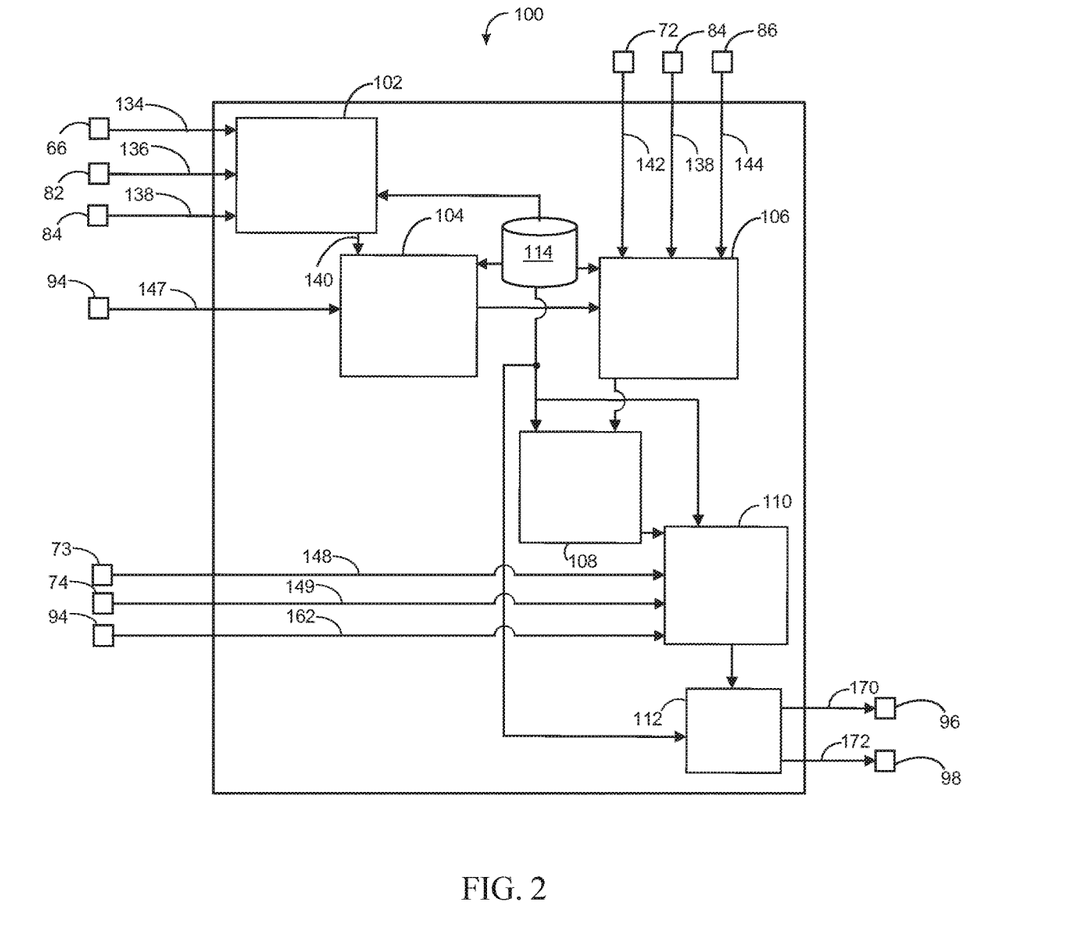
FIG. 2 is a dataflow diagram illustrating control aspects of a control system for the downforce allocation system of FIG. 1, in accordance with various embodiments.

The controller 56 generates output signals delivered to various controlled devices/actuators that are arranged to control the operation thereof. Additional output signals may be generated by the controller 56, for example, additional output signals may be associated with the propulsion system 30. In the embodiment of FIG. 2, the downforce allocation system 20 is implemented by an exemplary architecture 100, by or in coordination with, the controller 56 to control operation of the active-aero actuators 96, 98 in coordination with other systems of the vehicle 22, such as the propulsion system 30, the eAWD system 42, the eLSD system 49 and the steering system 48.

Referring additionally to FIG. 2, the downforce allocation system 20 may include the architecture 100 that may include a number of modules for carrying out processes to provide the controller 56 with information about the vehicle 22 and to determine optimum downforce allocation. In various embodiments, the architecture 100 of the downforce allocation system 20 generally includes a performance mode detection module 102, a maximum lateral grip determination module 104, a requested acceleration interpretation module 106, an optimum limit calculation module 108, an optimum downforce calculation module 110, an actuator control module 112 and a datastore 114. The control system 54 may include any number of additional modules to control aspects of the vehicle 22 independent of, or in coordination with, the modules of the architecture 100. For example, modules (not shown) that schedule the operation of the propulsion system 30 may use the outputs of the architecture 100 to determine the appropriate acceleration at any given time. In general, when a performance mode is detected, the downforce allocation system 20 determines an optimal downforce allocation between the front and rear axles 44, 46 of the vehicle 22 and positions the aerodynamic deflectors 97, 99 via the active-aero actuators 96, 98 to ensure the lateral tire forces are balanced at the vehicle level.

As shown in FIG. 3, the horizontal forces on a tire 26 during acceleration and turning of the vehicle 22 are represented in a force ellipse 120 with longitudinal and lateral components along the X-axis 65 and the Y-axis 66, respectively. The force ellipse 120 illustrates an indication of tire capacity and in general, larger forces may be generated longitudinally as compared to laterally. Inner ellipse 122 represents the used tire capacity at a point in time through a longitudinal force component of the $i^{th}$ tire ($F_{xi}$) 124 and a lateral force component of the $i^{th}$ tire ($F_{yi}$) 126. Outer ellipse 128 illustrates total tire capacity available through a longitudinal force component 130 of the $i^{th}$ tire ($F_{xi, max}$), and a lateral force component 132 of the $i^{th}$ tire ($F_{yi, max}$). The outer ellipse 128 represents the limit of the tire 26 to generate force. Not illustrated is the principle that the outer ellipse expands as normal force is increased, demonstrating that tire capacity increases with increased downward force, such as may be selectively applied by the aerodynamic deflectors 97, 99. In general, the normal force is the sum of a static load due to the weight of the vehicle 22, a force component in the Z-axis 67 direction due to horizontal accelerations, and the contribution from active aero generated by the aerodynamic deflectors 97, 99. The relationship is defined, for example, by the equation $F_{xi, max} = \mu_x F_{zi}$, where $F_{xi, max}$ is the maximum force the $i^{th}$ tire can generate in the longitudinal direction, $\mu_x$ is the applicable coefficient of friction in the longitudinal direction, and $F_{zi}$ is the total normal force at the $i^{th}$ tire. It should be understood that the longitudinal tire force generates speed changes in the vehicle 22, the lateral tire force generates trajectory changes of the vehicle 22 and that the outer ellipse 128 represents the limit on both.

Referring again to FIG. 4 along with FIG. 2, the downforce allocation system 20 will be described along with its operation through the process 200 and the architecture 100. The process 200 begins 202 with operation of the vehicle 22 and inputs are read 202 such as through signals 134, 136, 138 from the accelerometer 66, the pedal position sensor 82 and the steering angle sensor 84, respectively. The performance mode detection module 102 receives the signals 134, 136, 138, accesses programs 68 and data 70 such as from the datastore 114, and determines 206 whether the vehicle 22 is in a performance mode, for example by comparing acceleration and steering angle inputs to thresholds. The thresholds may be determined from analysis and testing for a particular vehicle configuration.

Figure 4:
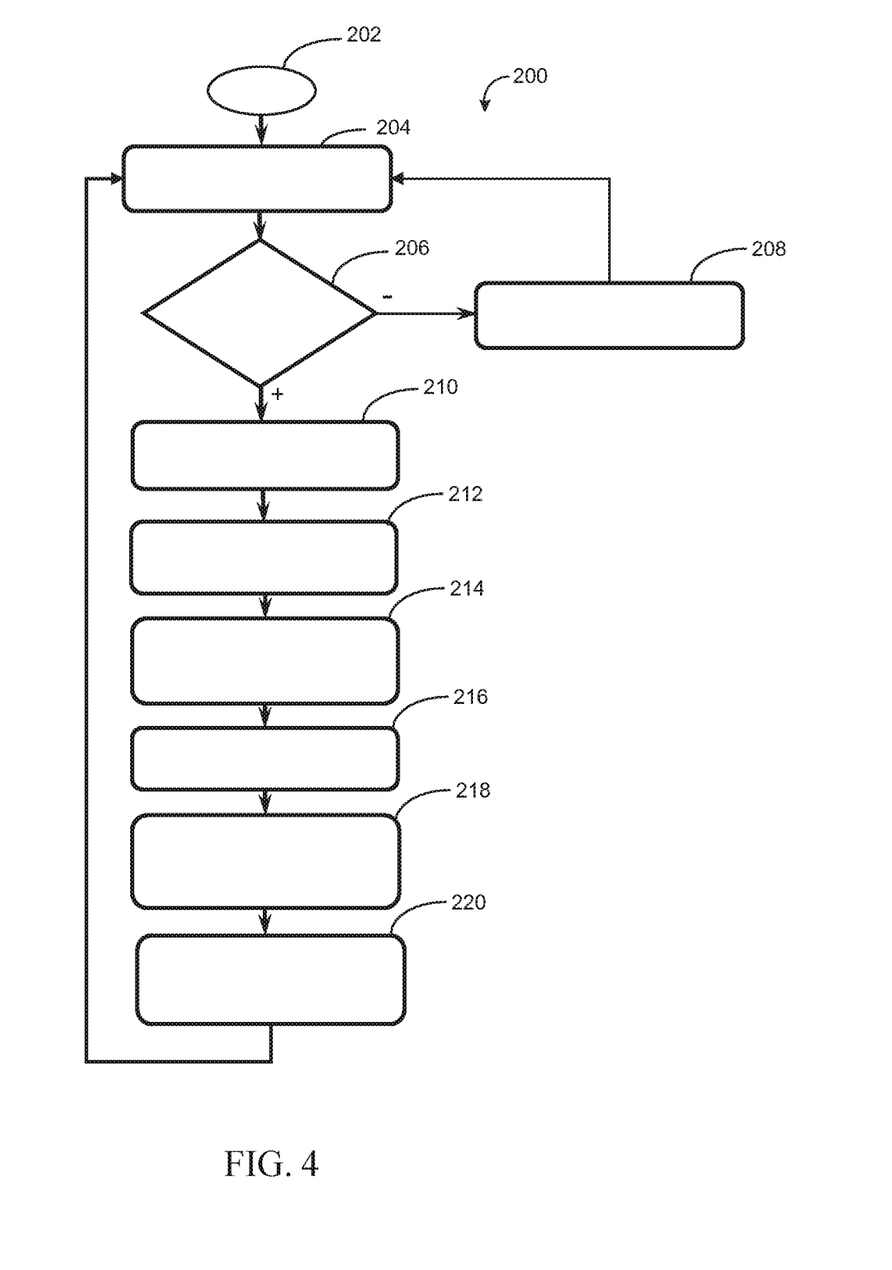
FIG. 4 is a flowchart illustrating a process for downforce allocation, in accordance with various embodiments.
Figure 5:
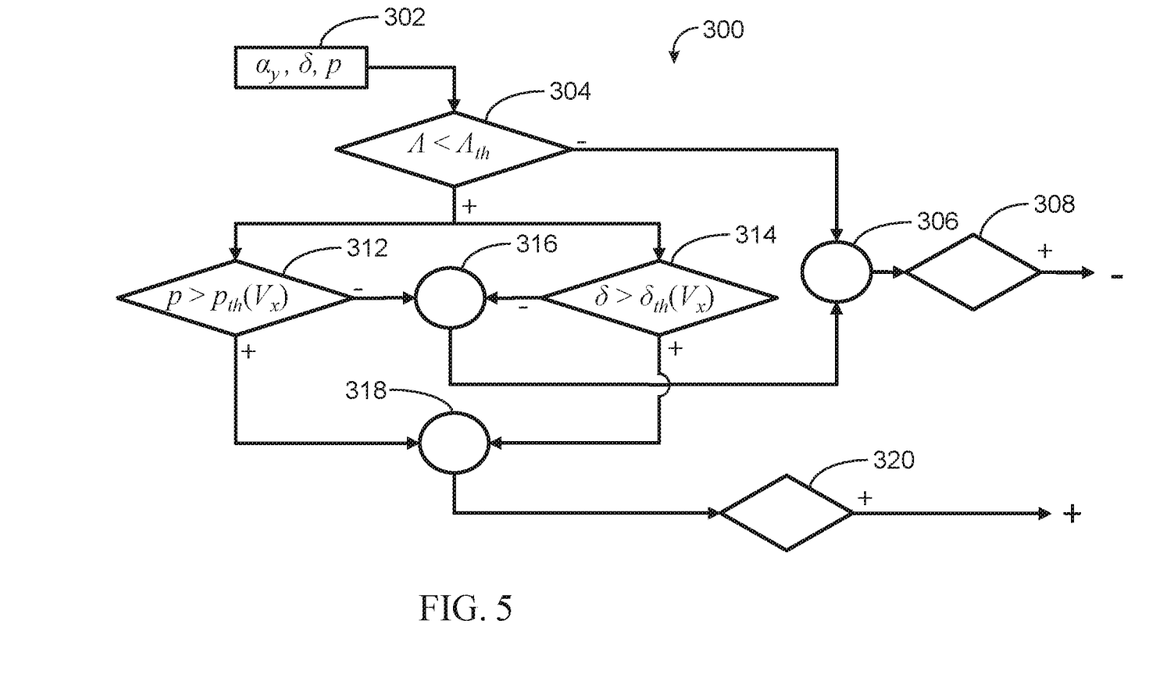
FIG. 5 is a flowchart illustrating a process for performance mode detection, in accordance with various embodiments.

The determination 206, may be carried out by the controller 56 and specifically by the performance mode detection module 102 and is detailed in the process 300 illustrated in FIG. 5, to which reference is additionally directed. Inputs 302, such as from the accelerometer 66, the pedal position sensor 82 and the steering angle sensor 84 are used to compare 304 the lateral grip margin to a threshold for lateral grip margin. This comparison 304 may be represented by $\Lambda < \Lambda_{th}$ and identifies whether a grip excursion condition is approaching. In the comparison, $\Lambda$ is the lateral grip margin and is equal to $$1 - \frac{a_y}{a_y^{lim}},$$

where $a_y$ is lateral acceleration such as is determined from the accelerometer 66, and $a_y^{lim}$ is maximum lateral acceleration/maximum grip as retrieved from the data store 312. For example, the applicable maximum lateral acceleration may be read from a lookup table. In other embodiments, the datastore 114 may contain an integrated tire and vehicle model developed for the configuration of the vehicle 22, and the processor 60 may use the model to calculate the applicable maximum lateral acceleration. When the lateral grip margin is less than the threshold for lateral grip, the lateral grip margin is low and the process 300 continues the evaluation of whether a performance mode is indicated. When the lateral grip margin is greater than the threshold for lateral grip, tire capacity exists and the conditional 306 is met 308 and a negative (−) determination 206 is made of whether a performance mode has been initiated and the process 200 proceeds to transient handling mode operation 208. In other words, a performance mode does not exist and added downforce from the aerodynamic deflectors 97, 99 is not required.

When the lateral grip margin is less than the threshold, the process 300 proceeds to evaluate 312 steering wheel angle and to evaluate 314 pedal position. In a number of embodiments, pedal position may refer to a position of the accelerator pedal 48 and/or to the position of a brake pedal (not shown), since both contribute to acceleration. In the evaluation 312, pedal position p is compared to a predefined threshold for pedal position $p_{th}$ by: $p > p_{th}(V_x)$ where the threshold is a function of velocity in the longitudinal direction. In the evaluation 314, steering angle δ is compared to a predefined threshold for steering angle $δ_{th}$ by: $δ > δ_{th}(V_x)$ where the threshold is a function of velocity in the longitudinal direction. The thresholds are determined for the configuration of the vehicle 22 such as through testing or analysis and indicate that a grip excursion is incipient. The thresholds may be retrieved from the datastore 114 or may be calculated by the processor 60 using the integrated tire and vehicle model. When both the pedal position and the steering angle are less than their respective threshold, tire capacity exists and the conditional 316 along with the conditional 306 are met 308, and a negative (−) determination 206 is made of whether a performance mode has been initiated, and the process 200 proceeds to transient handling mode operation 208.

When either of the determinations 312, 314 are positive and either the pedal position or the steering angle equals or exceeds its respective threshold, the conditional 318 is met 320 and a positive (+) determination 206 is made of whether a performance mode has been initiated. A performance mode initiated signal 140 is delivered to the maximum lateral grip determination module 104 and the process 200 proceeds to axle determine axle saturation and maximum lateral grip. To achieve maximum feasible lateral acceleration in limit handling maneuvers, effectively all unused tire capacity will be deployed in the lateral direction. The process 200 proceeds to determine 210 axle saturation because the maximum lateral grip occurs when both axles are simultaneously saturated and in limit handling the maximum lateral acceleration may be generated under that condition. Using vehicle dynamics, understeer and oversteer terminal lateral accelerations corresponding to front axle 44 and rear axle 46 saturations, respectively, are determined 210. The front axle 44 saturation is calculated using: $a_{Y,F}^{lim} = (LF_{Y,F}^{lim} + M_z^{ext})/mL_R$, where $M_z^{ext}$ is an external yaw moment such as introduced by activation of the eLSD system 49 via the eLSD actuator 94, or another torque vectoring device. The rear axle 46 saturation is calculated using: $a_{Y,R}^{lim} = (LF_{Y,R}^{lim} + M_z^{ext})/mL_F$, where $M_z^{ext}$ is again the external yaw moment. The condition for simultaneous axle saturation provides the maximum feasible grip without contribution from active-aero actuators that is then determined 212 and is represented as $a_{Y,F}^{lim} = a_{Y,R}^{lim}$, meaning the front and rear axles 44, 46 are saturated at the same time. From the foregoing it may be determined that:

$$\left( \frac{F_{Y,F}^{lim}}{L_R} - \frac{F_{Y,R}^{lim}}{L_F} \right) + \left( \frac{M_z^{EXT}}{L_F L_R} \right) = 0$$

where: $F_{Y,F}^{lim}$ is the lateral force capacity of the front axle 44;

$F_{Y,R}^{lim}$ is the lateral force capacity of the rear axle 46;

$L_F$ is the distance from the center of gravity of the vehicle 22 to the front axle 44;

$L_R$ is the distance from the center of gravity of the vehicle 22 to the rear axle 46; and $M_z^{ext}$ is an external yaw moment.

$L_F$ and $L_R$ are geometric parameters determined form the configuration of the vehicle 22, $M_z^{ext}$ is known from the eLSD system 49 and the eLSD actuator 94 via signal 147, and so there are two unknowns: $F_{Y,F}^{lim}$ and $F_{Y,R}^{lim}$ for which the maximum is found from the set of possible solutions via the relationship for lateral force capacity required to generate the maximum grip as further described below. The maximum grip is determined at the vehicle 22 level for overall vehicle capacity to generate lateral acceleration.

Figure 6:
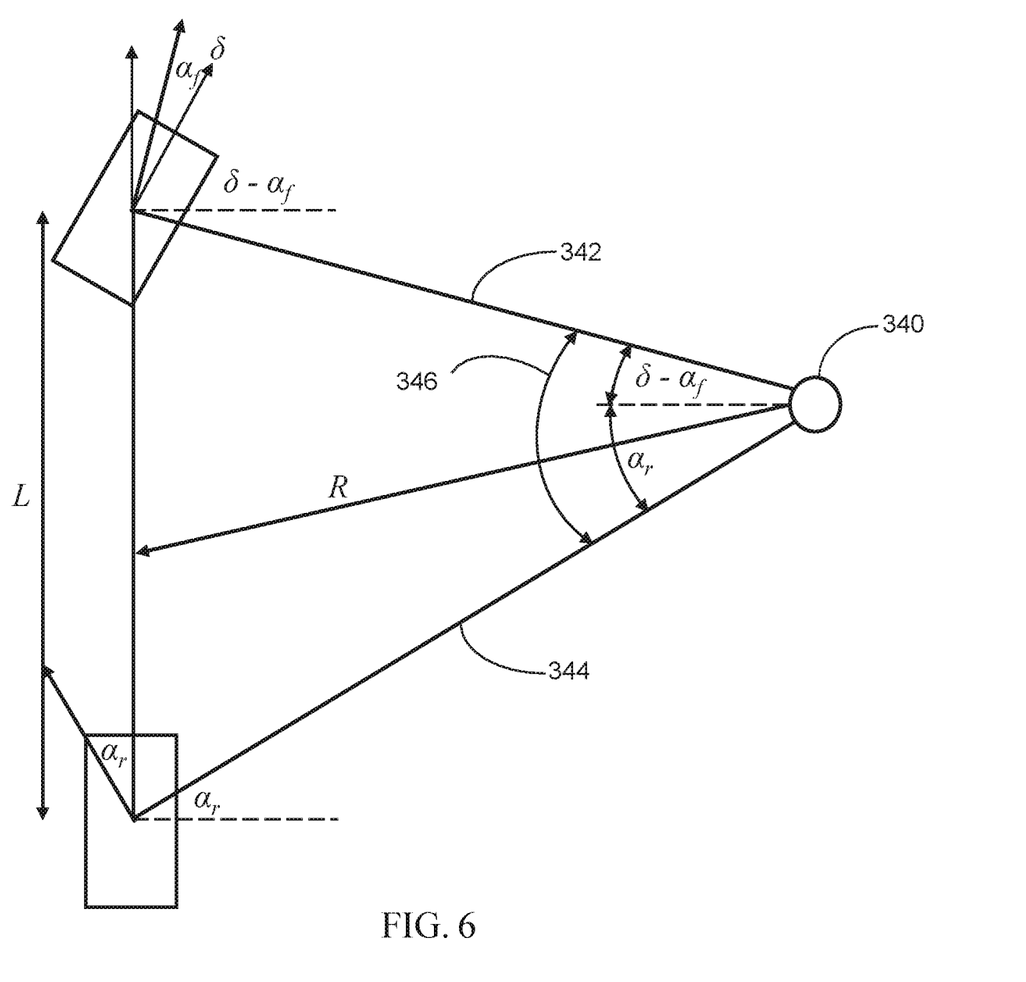
FIG. 6 is a diagram of a turn of the vehicle of FIG. 1, in accordance with various embodiments.

The process 200 proceeds to interpret 214 requested lateral acceleration, such as by the requested acceleration interpretation module 106 to consider the driver commands to define the desired lateral acceleration. In general, as illustrated in FIG. 6, the instantaneous turn center 340 of the vehicle 22 is a point at which two lines 342, 344 perpendicular to the velocities of the front and rear wheels 25 respectively, meet. The angle δ (346), subtended at the turn center 340 by the two lines 342, 344 is defined by $δ − (a_f − a_r)$. Assuming that the road radius over which the vehicle 22 is traversing in much larger than the wheelbase of the vehicle 22, the following equation is derived: $δ ≈ L/R + (a_f − a_r)$, where δ is steering input, L is wheel base of the vehicle 22, R is curvature radius of the turn, and $a_f$ and $a_r$ are front and rear slip angles, respectively. Slip angle is the difference between the direction the vehicle 22 is traveling and the direction that the body of the vehicle 22 is pointing. When turning, the direction of travel of a point at the front of the vehicle 22 is different than the direction of travel at the back of the vehicle 22. Slip angle may be determined using input from the inertial sensor package 72 via the signal 142. In a number of embodiments such as for offline evaluations, slip angle may be determined using measurements, such as from optical sensors, the inertial sensor package 72, and/or a GPS unit. In other embodiments, slip angle is calculated in real time as the ratio of lateral velocity to longitudinal velocity and lateral velocity and is estimated by a specific algorithm/observer.

Continuing with the process 200, at the interpretation 214 via the requested acceleration interpretation module 106, the steady state steering angle is determined by: $δ = L/R + (a_f − a_r)$, which may be expressed in terms of tire cornering coefficients "c" as:

$$δ = L/R + \left( \frac{W_f}{C_{a_f}} - \frac{W_r}{C_{a_r}} \right) \frac{V_x^2}{R}.$$

For a performance vehicle, the desired lateral acceleration is achieved when the tires are very stiff in the lateral direction which leads to the equation:

$$\lim_{C_{a_f}, C_{a_r} \to 0} \left( \frac{W_f}{C_{a_f}} - \frac{W_r}{C_{a_r}} \right) = 0,$$

so that $δ ≈ L/R$. The curvature $$R = \frac{V_x^2}{a_y^{req}}$$

may be substituted for R leading to the definition of the driver requested lateral acceleration as:

$$a_y^{req} = \frac{δ V_x^2}{L}.$$

Hence, the acceleration interpretation module 106 calculates the driver requested lateral acceleration using input from the steering angle sensor 84 via the signal 138, the wheelbase L of the vehicle 22 as may be retrieved from the datastore 114, and the lateral velocity V via the signal 144 from the speed sensor 86. The total force required is determined by multiplying the total acceleration by mass of the vehicle 22. Accordingly, the amount of total lateral force required is determined, which will be generated as a sum of the lateral forces at the front and rear axles 44, 46.

Figure 7:
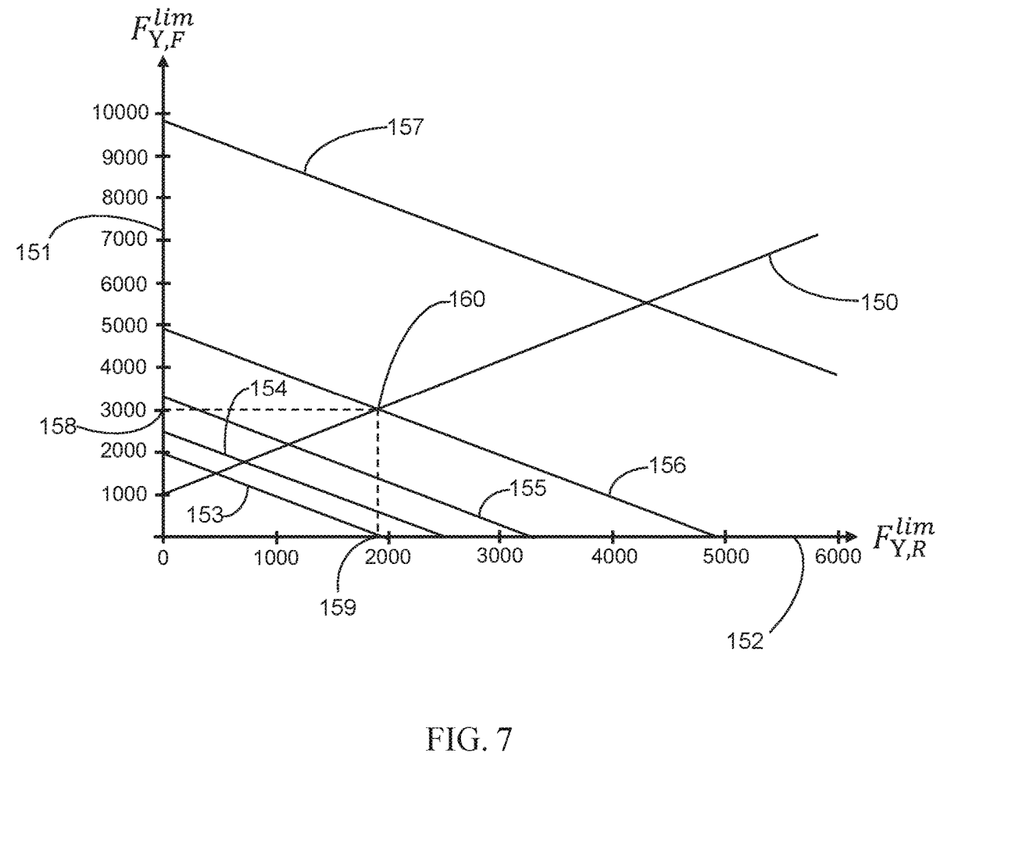
FIG. 7 is a graph of multiple conditions, in accordance with various embodiments.

The process 200 continues to calculate the optimum limit lateral force 216, such as by the optimum limit calculation module 108. A geometrical representation of the optimum limit lateral force solution is illustrated in FIG. 7 to which reference is directed. Depicted is lateral force limit in Newtons for the front axle 44 on the vertical axis 151 and lateral force limit in Newtons for the rear axle 46 on the horizontal axis 152. As described above, the equation $$\left(\frac{F_{Y,F}^{lim}}{L_R} - \frac{F_{Y,R}^{lim}}{L_F}\right) + \left(\frac{M_z^{EXT}}{L_F L_R}\right) = 0$$

is the relationship between force capacities to generate lateral grip and has two unknowns ($F_{Y,F}^{lim}$ and $F_{Y,R}^{lim}$). The equation is depicted in FIG. 7 by curve 150. As noted, the total lateral acceleration $$\left(\frac{\delta V_x^2}{L}\right)$$

multiplied by mass (m) equals the total lateral force:

$$\frac{m\delta V_x^2}{L},$$

and the summation of the lateral force at the front axle 44 plus the lateral force at the rear axle 46 equals the total lateral force leading to the equation:

$$F_{Y,F}^{lim} + F_{Y,R}^{lim} = \frac{m\delta V_x^2}{L}.$$

The equation $$F_{Y,F}^{lim} + F_{Y,R}^{lim} = \frac{m\delta V_x^2}{L}$$

has the same two unknowns ($F_{Y,F}^{lim}$ and $F_{Y,R}^{lim}$) and is depicted by a group of curves that show different lateral force requests based on the steering wheel inputs of the driver including curves 153, 154, 155, 156 and 157. The intersection between the curve 150 and one of the curves 153, 154, 155, 156 and 157 solves the equations for the respective driver inputs. Solving the equations together, for example for the curves 150 and 156, results in the lateral force limit ($F_{Y,F}^{lim}$) 158 at the front axle 44 and the lateral force limit ($F_{Y,R}^{lim}$) 159 at the rear axle 46. And so the optimum lateral force limits for the front and rear axles 44, 46 are calculated by the optimum limit calculation module 108. The optimum solution 160 is the intersection of the two curves 150, 156, satisfies the maximum lateral grip condition by coinciding with the curve 150, and satisfies the driver acceleration request by coinciding with the curve 156. The solution identifies the amount of lateral force capacity required of each axle 44, 46 to satisfy the two conditions of maximum grip and requested lateral acceleration. At the optimum solution 160, the front and rear limit lateral forces may be determined by the two equations:

$$F_{Y,F}^{lim*} = \frac{m\delta V_x^2}{L} - F_{Y,R}^{lim}, \text{ and: } F_{Y,R}^{lim*} = \left(-\frac{m\delta V_x^2}{L} + \frac{M_z^{EXT}}{L_R}\right)\frac{L}{L_F}.$$

The process 200 continues to determine 218, the optimum downforce to be added by active aero considering constraints, such as via the optimum downforce calculation module 110. Downforce allocation between the front and rear active aero elements such as the aerodynamic deflectors 97, 99 is found by using the tire ellipse equation and the connection between normal force and lateral force capacity is defined by the equations:

$$F_{Y,F}^{lim} = \Sigma_{i=1,fl,fr}\sqrt{\mu_i^2\left(\frac{F_{zF}^{aero}}{2} + F_{z,i}^{static} + F_{z,i}^{dynamic}\right)^2 - F_{x,i}^2},$$

which identifies the amount of downforce required at the front axle 44; and $$F_{Y,R}^{lim} = \Sigma_{i=1,rl,rr}\sqrt{\mu_i^2\left(\frac{F_{zR}^{aero}}{2} + F_{z,i}^{static} + F_{z,i}^{dynamic}\right)^2 - F_{x,i}^2},$$

which identifies the amount of downforce required at the rear axle 46,
where: is a tire/road coefficient;
$F_{z,i}^{static}$ is static load transfer at each wheel 25;
$F_{z,i}^{dynamic}$ is dynamic load transfer at each wheel 25;
$F_{x,i}$ is estimated longitudinal force of a tire 26;
$F_{zF}^{aero}$ is the front downward force contributed by the aerodynamic deflector 97; and
$F_{zR}^{aero}$ is the rear downward force contributed by the aerodynamic deflector 99.

The components of normal force include $F^{aero}$, $F^{static}$ and $F^{dynamic}$ for a tire 26. The controlled term is the downforce $F^{aero}$. To determine the amount of downforce to contribute by the aerodynamic deflectors 97, 99, the static and dynamic forces available at each wheel 25 are determined. The static force $F^{static}$ is determined based on the weight distribution and geometry of the vehicle, which may be retrieved from the datastore 114. The dynamic force $F^{dynamic}$ is the load transfer and is calculated using the vehicle's geometry and input signals 148, 149 from the longitudinal and lateral accelerometers 73, 74, respectively. $F_{Y,R}^{lim}$ is calculated as described above. $F_x$ is the contribution from the eAWD system 42 via the actuator 92 delivered by the signal 162. Accordingly, all values are known except for $F_z^{aero}$ and the equations may be solved to determine that value. The static and dynamic load transfers are calculated using the following equations:

$$F_{ij}^{static} = m_{ij}^s g;$$

-continued $$F_{z,fl}^{dynamic} = m^t\left(\frac{L_r}{L} - \frac{a_x H_{cg}}{gL}\right) * \frac{g}{2} - m^t\left(\frac{L_r}{L} - \frac{a_x H_{cg}}{gL}\right)\frac{a_y H_{rc}}{2T_f};$$

$$F_{z,fr}^{dynamic} = m^t\left(\frac{L_r}{L} - \frac{a_x H_{cg}}{gL}\right) * \frac{g}{2} - m^t\left(\frac{L_r}{L} - \frac{a_x H_{cg}}{gL}\right)\frac{a_y H_{rc}}{2T_f};$$

$$F_{z,rl}^{dynamic} = m^t\left(\frac{L_f}{L} - \frac{a_x H_{cg}}{gL}\right) * \frac{g}{2} - m^t\left(\frac{L_r}{L} - \frac{a_x H_{cg}}{gL}\right)\frac{a_y H_{rc}}{2r}; \text{ and}$$

$$F_{z,rr}^{dynamic} = m^t\left(\frac{L_f}{L} - \frac{a_x H_{cg}}{gL}\right) * \frac{g}{2} - m^t\left(\frac{L_r}{L} - \frac{a_x H_{cg}}{gL}\right)\frac{a_y H_{rc}}{2T_f},$$

where: $m^t$ is total mass;
$a_x$ is longitudinal acceleration;
$a_y$ is lateral acceleration;
$H_{cg}$ is the center of gravity height in the vehicle 22;
$H_{rc}$ is the roll center height of the vehicle 22;
$L_f$ is distance from the vehicle center of gravity to the front axle 44;
$L_r$ is distance from the vehicle center of gravity to the rear axle 46;
$T_f$ is the front trackwidth of the vehicle 22; and
$T_r$ is the rear trackwidth of the vehicle 22.

Continuing with the process 200, the actuator 96, 98 capacity constraints are considered while allocating downforces to the front axle 44 and rea axle 46 by:

$$F_{y,F}^{lim,max} = \Sigma_{i=fl,fr}\sqrt{\mu_i\left(\frac{F_{zF}^{aero,max}}{2} + F_{z,i}^{static} + F_{z,i}^{dynamic}\right)^2 - F_{x,i}^2};$$

$$F_{y,R}^{lim,max} = \Sigma_{i=rl,rr}\sqrt{\mu_i\left(\frac{F_{sR}^{aero,max}}{2} + F_{z,i}^{static} + F_{z,i}^{dynamic}\right)^2 - F_{x,i}^2};$$

$$F_{y,F}^{lim,max} = \Sigma_{i=fl,fr}\sqrt{\mu_i\left(F_{z,i}^{static} + F_{z,i}^{dynamic}\right)^2 - F_{x,i}^2}; \text{ and}$$

$$F_{y,R}^{lim,max} = \Sigma_{i=rl,rr}\sqrt{\mu_i\left(F_{z,i}^{static} + F_{z,i}^{dynamic}\right)^2 - F_{x,i}^2},$$

where $F_{zF}^{aero,max}$ is calculated considering the actuator physical capability at each sampling time as: $F_{zF}^{aero,max}=\frac{1}{2}CV_x^2$, $C=\rho AC_l$, where $C_l$ is lift coefficient, $\rho$ is air density, and A is frontal area of the vehicle 22.

Figure 8:
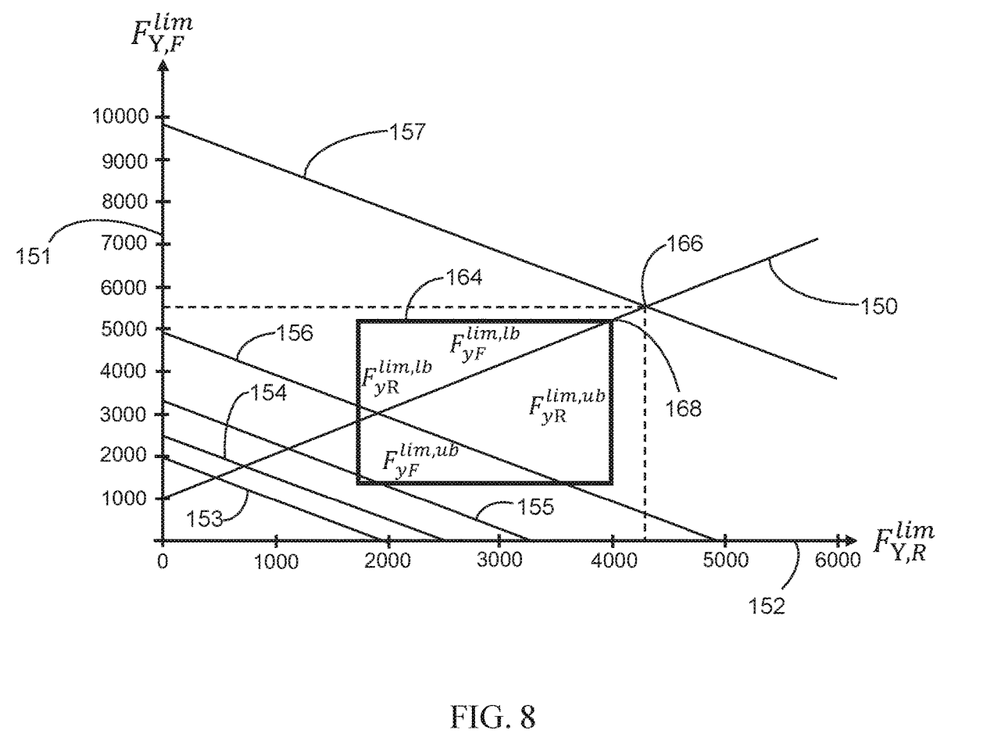
FIG. 8 is a graph of multiple conditions depicting actuator constraints, in accordance with various embodiments.

In FIG. 8, an illustration similar to FIG. 7 shows the effect of considering actuator constraints. The area 164 designates the area where the potential solutions are achievable by the aerodynamic deflectors 87, 99. For example the point 166 at the intersection of the curves 150, 157 is an optimum solution based on the driver request indicated by curve 157. However, the point 166 lies outside the area 164 and is therefore not achievable. Accordingly, the requested lateral acceleration is not achievable and the point 168 is the optimal feasible solution where the aerodynamic deflectors 97, 99 are capable of supplying the needed downforce, satisfies the maximum grip condition on the curve 150, and the vehicle 22 remains stable because the operating point is on the curve 150. However, because of the aerodynamic deflectors 97, 99 limitations, the controller 56 does not generate the requested lateral acceleration of curve 157 at point 166. Accordingly, the two equations are solved and the optimum solution is limited due to aerodynamic deflector 97, 99 constraints to the best feasible solution 168.

When the determination 218 is finalized, the actuators 96, 98 are operated 220, such as by the actuator control module 112 via the signals 170, 172 respectively, to position the aerodynamic deflectors 97, 99 to produce the necessary downforce at the front axle 44 and the rear axle 46. Accordingly, the downforce optimization system 20 fulfills driver lateral acceleration requests with minimum drag force. The condition for maximum grip is determined where both axles are saturated at the same time. The available tire capacity is fully utilized. The amount of requested acceleration and total force is determined and the two are combined to determine the maximum tire capacity laterally at each axle. The downforce for the front and rear axles 44, 46 is determined considering the constraints. The control commands 170, 172 are sent to the actuators 96, 98 to effect the optimum downforce at each axle 44, 48 via positioning of the aerodynamic deflectors 97, 99.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for generating a downforce on a vehicle having front wheels and rear wheels, the system comprising:
    an aerodynamic deflector on the vehicle that is repositionable;
    an actuator coupled with the aerodynamic deflector; and
    a controller configured to:
        detect a performance mode of operation of the vehicle;
        determine a requested lateral acceleration;
        determine, when the performance mode is detected, a physical capability of the aerodynamic actuator to generate downforce;
        evaluate whether the requested lateral acceleration results in a control adjustment request that exceeds the physical capability of aerodynamic actuator in generating downforce;
        calculate a control adjustment of the aerodynamic deflector, wherein the calculation determines the downforce to achieve the requested lateral acceleration and maximize lateral grip of the vehicle, wherein the control adjustment is limited by the physical capability of the aerodynamic actuator;
        determine a relationship between force capacities of the front and rear wheels to generate the lateral grip, wherein the relationship between force capacities of the front and rear wheels is determined based on a lateral force limit at the front wheels, a lateral force limit at the rear wheels, a distance from a center of gravity of the vehicle to the front wheels, a distance from the center of gravity to the rear wheels, and an external yaw moment on the vehicle; and
        operate the actuator to effect the control adjustment of the aerodynamic deflector to generate the downforce on the vehicle within constraints of the aerodynamic deflector to achieve an optimal feasible solution where the aerodynamic deflector is capable of supplying the downforce.

2. The system of claim 1, wherein the controller is configured to determine an optimum allocation of the downforce between a front and a rear of the vehicle.

3. The system of claim 1, comprising a steering angle sensor on the vehicle and a pedal position sensor on the vehicle, wherein the controller is configured to determine the requested lateral acceleration based on inputs from the steering angle sensor and the pedal position sensor.

4. The system of claim 1, wherein the controller is configured to determine the maximum lateral grip achievable by the vehicle where all available tire capacity is used in a lateral direction of the vehicle.

5. The system of claim 1, wherein the controller is configured to determine a minimum required downforce contributed by the aerodynamic deflector to minimize effects of the aerodynamic deflector on forward movement of the vehicle.

6. The system of claim 1, comprising a steering angle sensor on the vehicle and a pedal position sensor on the vehicle, wherein the controller is configured to detect the performance mode of the vehicle based on inputs from the steering angle sensor and the pedal position sensor.

7. The system of claim 1, wherein the relationship between force capacities of the front and rear wheels to generate the lateral grip determines a maximum feasible grip of the front and rear wheels.

8. The system of claim 7, wherein the controller is configured to:
determine a lateral force request based on the requested lateral acceleration; and
determine an optimum solution to satisfy both the relationship between force capacities of the front and rear wheels, and the lateral force request.

9. The system of claim 1, wherein the relationship between the force capacities of the front and rear wheels is defined by $$\left(\frac{F_{Y,F}^{lim}}{L_R} - \frac{F_{Y,R}^{lim}}{L_F}\right) + \left(\frac{M_z^{EXT}}{L_F L_R}\right) = 0;$$

where $F_{Y,F}^{lim}$ is the lateral force limit at the front wheels, $F_{Y,R}^{lim}$ is the lateral force limit at the rear wheels, LF is the distance from a center of gravity of the vehicle to the front wheels; $L_R$ is the distance from the center of gravity to the rear wheels, and $M_z^{ext}$ is the external yaw moment on the vehicle.

10. The system of claim 9, wherein the lateral force request is defined by:

$$F_{Y,F}^{lim} + F_{Y,R}^{lim} = \frac{m\delta V_x^2}{L};$$

where m is mass of the vehicle, δ is a steering angle of the vehicle, V is velocity of the vehicle in a longitudinal direction, and L is a wheelbase of the vehicle.

11. A method for generating a downforce on a vehicle, the method comprising:
detecting, by a controller, a performance mode of operation of the vehicle;
determining, by the controller, a requested lateral acceleration;
calculating, by the controller, a control adjustment of an aerodynamic deflector to generate a downforce to achieve the requested lateral acceleration and maximize lateral grip of the vehicle;
operating, by the controller, an actuator coupled to an aerodynamic deflector to effect the control adjustment of the aerodynamic deflector to generate the downforce on the vehicle;
determining, by the controller, a relationship between force capacities of front and rear wheels of the vehicle to generate the lateral grip;
determining the relationship between force capacities of the front and rear wheels by:

$$\left(\frac{F_{Y,F}^{lim}}{L_R} - \frac{F_{Y,R}^{lim}}{L_F}\right) + \left(\frac{M_z^{EXT}}{L_F L_R}\right) = 0;$$

where $F_{Y,F}^{lim}$ is a lateral force limit at the front wheels, $F_{Y,R}^{lim}$ is a lateral force limit at the rear wheels, LF is a distance from a center of gravity of the vehicle to the front wheels; $L_R$ is a distance from the center of gravity to the rear wheels, and $M_z^{ext}$ is an external yaw moment on the vehicle; and
determining the lateral force request is by:

$$F_{Y,F}^{lim} + F_{Y,R}^{lim} = \frac{m\delta V_x^2}{L};$$

where m is mass of the vehicle, δ is a steering angle of the vehicle, Vis velocity of the vehicle in a longitudinal direction, and L is a wheelbase of the vehicle.

12. The method of claim 11, comprising determining, by the controller, an optimum allocation of the downforce between a front and a rear of the vehicle.

13. The method of claim 11, comprising determining, by the controller, the requested lateral acceleration based on inputs from a steering angle sensor and a pedal position sensor.

14. The method of claim 11, comprising determining, by the controller, the maximum lateral grip achievable by the vehicle where all available tire capacity is used in a lateral direction of the vehicle.

15. The method of claim 11, comprising determining, by the controller, a minimum required downforce contributed by the aerodynamic deflector to minimize effects of the aerodynamic deflector on forward movement of the vehicle.

16. The method of claim 11, wherein the detecting the performance mode of the vehicle is based on inputs from a steering angle sensor and a pedal position sensor.

17. The method of claim 11, wherein the detecting the performance mode of the vehicle includes determining whether a grip excursion is approaching by comparing the lateral grip margin to a threshold for lateral grip margin.

18. The method of claim 11, comprising:
determining, by the controller, a lateral force request based on the requested lateral acceleration; and
determining, by the controller, an optimum solution to satisfy both the relationship between force capacities of the front and rear wheels, and the lateral force request.

19. The method of claim 11, comprising determining, by the controller, a maximum lateral grip, wherein the downforce is calculated based on a maximum lateral grip of the vehicle and a driver requested lateral acceleration.

20. A vehicle with active-aero actuators, comprising:
a first aerodynamic deflector at a front of the vehicle;
a second aerodynamic deflector at a rear of the vehicle;

a first actuator coupled with the first aerodynamic deflector;

a second actuator coupled with the second aerodynamic deflector; and a controller configured to:

detect a performance mode of operation of the vehicle;

determine a maximum lateral grip condition of the vehicle without contribution from the active-aero actuators;

determine a requested lateral acceleration;

determine a relationship between force capacities of the front and rear wheels to generate the lateral grip, the relationship between force capacities of the front and rear wheels by:

$$\left(\frac{F_{Y,F}^{lim}}{L_R} - \frac{F_{Y,R}^{lim}}{L_F}\right) + \left(\frac{M_z^{EXT}}{L_F L_R}\right) = 0;$$

where $F_{Y,F}^{lim}$ is a lateral force limit at the front wheels, $F_{Y,R}^{lim}$ is a lateral force limit at the rear wheels, $L_F$ is a distance from a center of gravity of the vehicle to the front wheels; $L_R$ is a distance from the center of gravity to the rear wheels, and $M_z^{ext}$ is an external yaw moment on the vehicle;

calculate, using the relationship between force capacities, control adjustments of the first and second aerodynamic deflectors to generate a downforce that is balanced between the front and the rear of the vehicle to achieve the requested lateral acceleration and maximize lateral grip of the vehicle; and   operate the first and second actuators to effect the control adjustments of the first and second aerodynamic deflectors to generate the downforce on the vehicle.

\* \* \* \* \*